(12) United States Patent
Brown et al.

(10) Patent No.: US 9,563,359 B2
(45) Date of Patent: *Feb. 7, 2017

(54) SYSTEM AND METHOD FOR TRANSFORMING AN IN-USE RAID ARRAY INCLUDING MIGRATING DATA USING RESERVED EXTENTS

(71) Applicant: International Business Machines Corporation, Armonk, NY (US)

(72) Inventors: Joanna K. Brown, Winchester (GB); Matthew J. Fairhurst, Winchester (GB); William J. Scales, Winchester (GB); Mark B. Thomas, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,851

(22) Filed: Oct. 19, 2015

(65) Prior Publication Data

US 2016/0041764 A1     Feb. 11, 2016

Related U.S. Application Data

(63) Continuation of application No. 13/878,061, filed as application No. PCT/EP2011/064976 on Aug. 31, 2011, now Pat. No. 9,195,412.

(30) Foreign Application Priority Data

Oct. 7, 2010  (EP) ..................... 10186891

(51) Int. Cl.
*G06F 3/06* (2006.01)
*G06F 11/10* (2006.01)

(52) U.S. Cl.
CPC ............. *G06F 3/0604* (2013.01); *G06F 3/061* (2013.01); *G06F 3/0608* (2013.01);
(Continued)

(58) Field of Classification Search
CPC .... G06F 3/0689; G06F 3/0646; G06F 3/0647; G06F 3/061; G06F 3/0631; G06F 3/0632; G06F 3/0634; G06F 3/0665; G06F 11/1076
See application file for complete search history.

(56) References Cited

U.S. PATENT DOCUMENTS 5,542,065 A   7/1996 Burkes et al.
5,574,851 A   11/1996 Rathunde
(Continued)

FOREIGN PATENT DOCUMENTS

CN   101034340 A   9/2007
CN   101556802 A   10/2009
(Continued)

OTHER PUBLICATIONS

Notice of Allowance from U.S. Appl. No. 14/151,347, dated Jan. 8, 2015.
(Continued)

*Primary Examiner* — Sanjiv Shah
*Assistant Examiner* — Glenn Gossage
(74) *Attorney, Agent, or Firm* — Zilka-Kotab, PC

(57) ABSTRACT

A system is provided for transforming an in-use RAID array from a first array configuration having a first parameter to a second array configuration having a second parameter while preserving a logical data structure of the RAID array. The system includes an extent reservation component, and a data migration component for reading unmigrated data from an area of an array arranged according to the first array configuration and writing the data to an area of the array
(Continued)

arranged according to the second array configuration using reserved extents to store migrated data. The system also includes a first I/O component for performing I/O according to the first array configuration on unmigrated data prior to its reading by the data migration component, and a second I/O component for performing I/O according to the second array configuration on the migrated data after writing the migrated data.

20 Claims, 7 Drawing Sheets

(52) U.S. Cl.
CPC .......... *G06F 3/0614* (2013.01); *G06F 3/0632* (2013.01); *G06F 3/0659* (2013.01); *G06F 3/0689* (2013.01); *G06F 11/1096* (2013.01)

(56) References Cited

U.S. PATENT DOCUMENTS

| | | | |
|---|---|---|---|
| 5,615,352 | A | 3/1997 | Jacobson et al. |
| 6,052,759 | A | 4/2000 | Stallmo et al. |
| 6,898,668 | B2 | 5/2005 | Thompson et al. |
| 7,454,566 | B1 | 11/2008 | Overby |
| 7,702,850 | B2 | 4/2010 | Ludwig et al. |
| 7,721,044 | B1 | 5/2010 | Chatterjee et al. |
| 7,873,619 | B1 | 1/2011 | Faibish et al. |
| 8,677,066 | B2 | 3/2014 | Agombar et al. |
| 8,799,571 | B1 | 8/2014 | DesRoches et al. |
| 9,032,148 | B2 | 5/2015 | Agombar et al. |
| 9,195,412 | B2 * | 11/2015 | Brown .................. G06F 3/0604 |
| 2004/0172503 | A1 | 9/2004 | Merchant |
| 2008/0005612 | A1 | 1/2008 | Arai |
| 2008/0109601 | A1 | 5/2008 | Klemm et al. |
| 2008/0263277 | A1 * | 10/2008 | Matsunami ........... G06F 3/0608 711/117 |
| 2009/0089534 | A1 * | 4/2009 | Zohar .................. G06F 3/0608 711/173 |
| 2011/0264855 | A1 | 10/2011 | Kasako |
| 2012/0089777 | A1 | 4/2012 | Agombar et al. |
| 2013/0205086 | A1 | 8/2013 | Brown et al. |
| 2014/0129768 | A1 | 5/2014 | Agombar et al. |
| 2015/0242152 | A1 | 8/2015 | Agombar et al. |

FOREIGN PATENT DOCUMENTS

| | | |
|---|---|---|
| CN | 101809551 A | 8/2010 |
| EP | 1564634 A2 | 8/2005 |
| WO | 2004036424 A2 | 4/2004 |
| WO | 2012045529 A1 | 4/2012 |

OTHER PUBLICATIONS

European Application No. 10186891.7, filed Oct. 7, 2010.
International Search Report and Written Opinion from PCT Application No. PCT/EP11/64976, dated Oct. 5, 2011.
Final Office Action from U.S. Appl. No. 14/151,347, dated Oct. 10, 2014.
Non-Final Office Action from U.S. Appl. No. 13/223,160, dated Feb. 28, 2013.
Non-Final Office Action from U.S. Appl. No. 14/151,347, dated May 7, 2014.
Notice of Allowance from U.S. Appl. No. 13/223,160, dated Jul. 24, 2013.
Notice of Allowance from U.S. Appl. No. 13/223,160, dated Oct. 31, 2013.
Non-Final Office Action from U.S. Application No. 13/878,061, dated Mar. 13, 2015.
Notice of Allowance from U.S. Appl. No. 13/878,061, dated Jul. 8, 2015.
Supplemental Notice of Allowance from U.S. Appl. No. 13/878,061, dated Oct. 29, 2015.
Non-Final Office Action from U.S. Appl. No. 14/700,072, dated Mar. 10, 2016.
Final Office Action from U.S. Appl. No. 14/700,072, dated Jul. 1, 2016.
Notice of Allowance from U.S. Appl. No. 14/700,072, dated Sep. 14, 2016.

* cited by examiner

SYSTEM AND METHOD FOR TRANSFORMING AN IN-USE RAID ARRAY INCLUDING MIGRATING DATA USING RESERVED EXTENTS

BACKGROUND

The present invention relates to the control of RAID storage, and particularly to the transformation of RAID storage in a virtualized storage environment.

In a storage system where data is stored on one or more RAID arrays, parameters such as the number of disks in the RAID arrays, the size of the disks in the RAID arrays, and the RAID level used are usually fixed at array creation time. Once an array has been created and data has been stored on it, it is usually not possible to change any of these parameters without deleting the RAID array, destroying all the data, and re-creating the array with the new parameters.

Some storage systems allow limited expansion of RAID arrays, e.g., from a RAID-5 array with five disks to a RAID-5 array with eight disks. However, this is done by putting the new storage capacity contiguously on the three new disks and recalculating the parity that already exists on the original five disks. This has the disadvantage that the new data is not striped across the array, and the new disks do not contribute to the parity overhead, which means the performance will be lower than that of a freshly created RAID-5 array with eight disks. Some storage systems allow expansion from RAID-5 to RAID-6 with the addition of a single disk, but that is the only transformation allowed.

One example of a limited facility for expanding a RAID array by adding one or more new disks is disclosed in published PCT Patent Application WO 2004/036424, to Zimmerman, et al., which describes the transformation of a RAID array to take advantage of the additional disk resource by means of a mechanism that scatters a subset of the existing data across the new disk space and subsequently inserts data in the remaining new disk space. Disadvantageously, with the mechanism thus disclosed, the layout of data is substantially changed in the post-transformation array.

It is thus desirable to address these shortcomings of known RAID storage systems.

SUMMARY

The illustrative embodiments provide, in a first aspect, a system for transforming an in-use RAID array from a first array configuration having at least a first parameter to a second array configuration having at least a second parameter while preserving a logical data structure of the in-use RAID array, comprising: an extent reservation component for reserving one or more reserved extents; a data migration component for reading unmigrated data from an area of the in-use RAID array arranged according to the first array configuration and writing the data to an area of the in-use RAID array arranged according to the second array configuration using the one or more reserved extents to store at least first migrated data and using one or more further extents to store at least second migrated data; a first I/O component for performing I/O operations according to the first array configuration on the immigrated data prior to reading by the data migration component; and a second I/O component for performing I/O operations according to the second array configuration on the at least first migrated data and the at least second migrated data after the migrated data is written by the data migration component.

In one illustrative embodiment, the second array configuration comprises a greater number of disks than the first array configuration. In one illustrative embodiment, the second array configuration comprises a greater storage capacity than the first array configuration. In one illustrative embodiment, the RAID array comprises a first number of disks of a first capacity and a second number of disks of a second capacity, and wherein the first array configuration uses the first and the second number of disks and the second array configuration uses only the first or the second number of disks and not both. In one illustrative embodiment, the first capacity is greater than the second capacity. In one illustrative embodiment, the second capacity is greater than the first capacity. In one illustrative embodiment, the second array configuration is of a higher RAID level than the first array configuration. It will be clear to one of ordinary skill in the art that the sizes or number of disks of the second array configuration, or the RAID level of the second array configuration, may be lower than those of the first array configuration.

In a second aspect, there is provided a method of transforming an in-use RAID array from a first array configuration having at least a first parameter to a second array configuration having at least a second parameter while preserving a logical data structure of the in-use RAID array, comprising: reserving, by an extent reservation component, one or more reserved extents; reading, by a data migration component, unmigrated data from an area of the in-use RAID array arranged according to the first array configuration and writing by the data migration component, the data to an area of the in-use RAID array arranged according to the second array configuration using the one or more reserved extents to store at least first migrated data and using one or more further extents to store at least second migrated data; performing, by a first I/O component, I/O operations according to the first array configuration on the unmigrated data prior to its reading by the data migration component; and performing, by a second I/O component, I/O operations according to the second array configuration on the at least first migrated data and the at least second migrated data after its writing the migrated data is written by the data migration component.

In one illustrative embodiment, the second array configuration comprises a greater number of disks than the first array configuration. In one illustrative embodiment, the second array configuration comprises a greater storage capacity than the first array configuration. In one illustrative embodiment, the RAID array comprises a first number of disks of a first capacity and a second number of disks of a second capacity, and the first array configuration uses the first and the second number of disks and the second array configuration uses only the first or the second number of disks and not both. In one illustrative embodiment, the first capacity is greater than the second capacity. In one illustrative embodiment, the second capacity is greater than the first capacity. In one illustrative embodiment, the second array configuration is of a higher RAID level than the first array configuration. It will be clear to one of ordinary skill in the art that the sizes or number of disks of the second array configuration, or the RAID level of the second array configuration, may be lower than those of the first.

In a third aspect, there is provided a computer program product comprising computer program code to, when loaded into a computer system and executed thereon, cause the computer system to perform various ones and combinations of the operations of the method according to the second aspect.

In an exemplary embodiment, the illustrative embodiments provide a system, method, and computer program product for controlling virtualized volumes stored on RAID arrays, adapted to migrate data from one part of a RAID array to another without affecting the data structure that is used for the data. By careful control of the location of the virtualized data, and the upfront reservation of spare capacity on the RAID array, it is possible to transform the underlying RAID array from one set of parameters to another, in place, without destruction of data, and in a way that means the resulting data layout is the same as, or close to the same as would be expected if a new RAID array was created with the new parameters.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As described in the Background section above, in a storage system according to the prior art where data is stored on one or more RAID arrays, parameters such as the number of disks in the RAID arrays, the size of the disks in the RAID arrays, and the RAID level used are usually fixed at array creation time. Once an array has been created and data has been stored on it, it is usually not possible to change any of these parameters without deleting the RAID array, destroying all the data, and re-creating the array with the new parameters.

In its broadest application, an illustrative embodiment of the present invention provides a system, method of operation, and computer program product for controlling virtualized volumes stored on RAID arrays, adapted to migrate data from one part of a RAID array to another without affecting the logical address that is used to address the data.

Illustrative embodiments of the present invention address the shortcomings of the state of the art by providing enhanced control of the location of the virtualized data, and the upfront reservation of spare capacity on the RAID array, thereby making it possible to transform the underlying RAID array from one set of parameters to another, in place, without destruction of data, and in a way that means the resulting data layout is the same as, or close to the same as, would be expected if a new RAID array was created with the new parameters.

Figure 1:
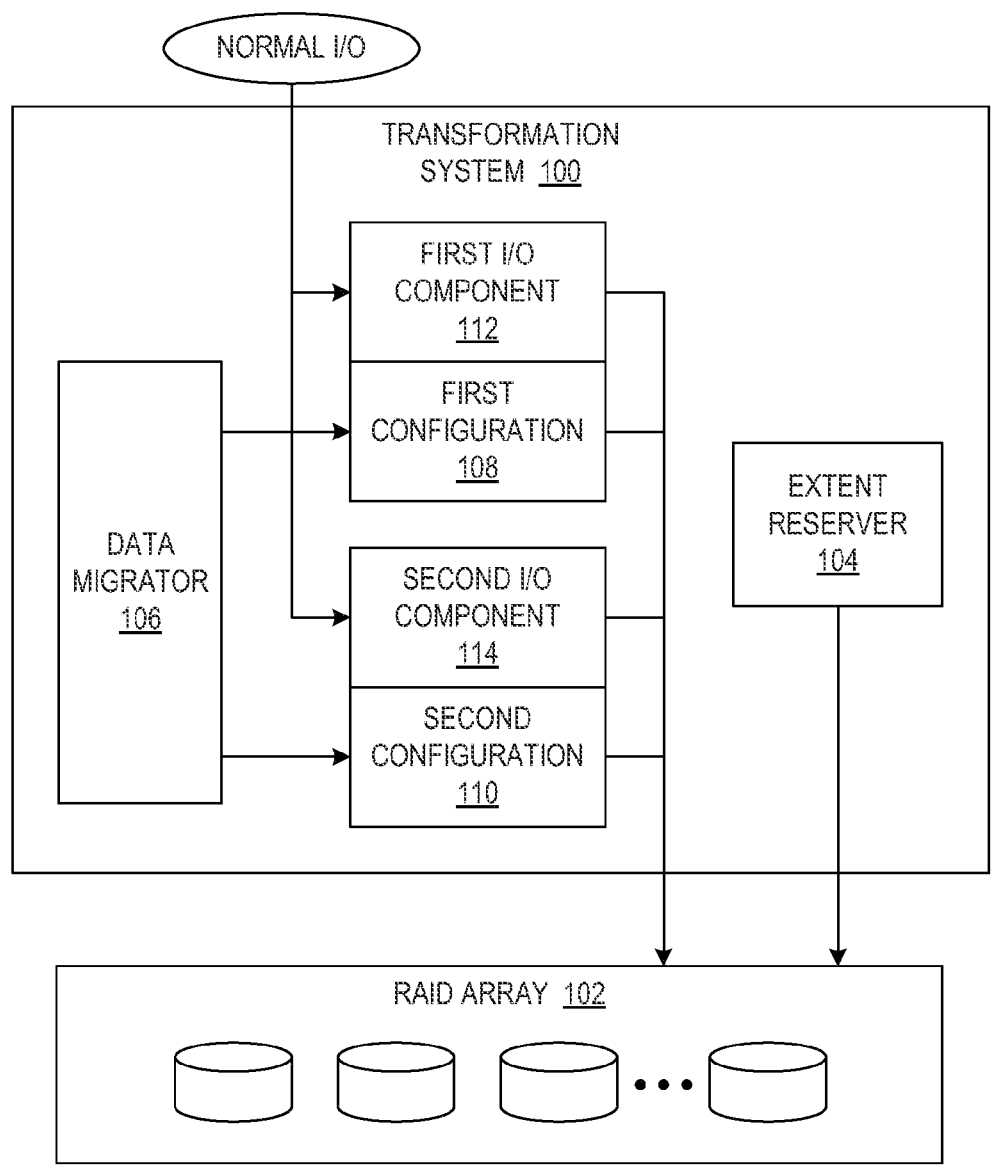
FIG. 1 shows a transformation system for transforming an in-use RAID array according to one illustrative embodiment of the present invention.

Turning to FIG. 1, there is shown in a simplified schematic form a system according to one illustrative embodiment of the present invention. FIG. 1 shows a transformation system 100 for transforming an in-use RAID array 102 from a first array configuration 108 to a second array configuration I/O while preserving a logical data structure of the in-use RAID array. The transformation system 100 comprises an extent reservation component 104 for reserving one or more reserved extents in RAID array 102. The transformation system 100 further comprises a data migration component 106 for reading unmigrated data from an area of the in-use RAID array 102 arranged according to the first array configuration 108 and writing the data to an area of the in-use RAID array 102 arranged according to the second array configuration I/O using one or more of the reserved extents. The transformation system 100 further comprises a first I/O component 112 for performing I/O operations according to the first array configuration on unmigrated data prior to its reading by the data migration component 106 and a second I/O component for performing I/O operations according to the second array configuration 110 on migrated data after its writing by the data migration component 106.

The second array configuration I/O may comprise a greater number of disks than the first array configuration 108, may comprise a greater storage capacity than the first array configuration, may comprise disks of different storage capacities or may be of a higher RAID level than the first array configuration. Thus the transformation system 100 may transform the RAID array 102 by changing the array configuration parameters in respect of, for example, disk numbers, disk capacities and RAID level.

Figure 2:
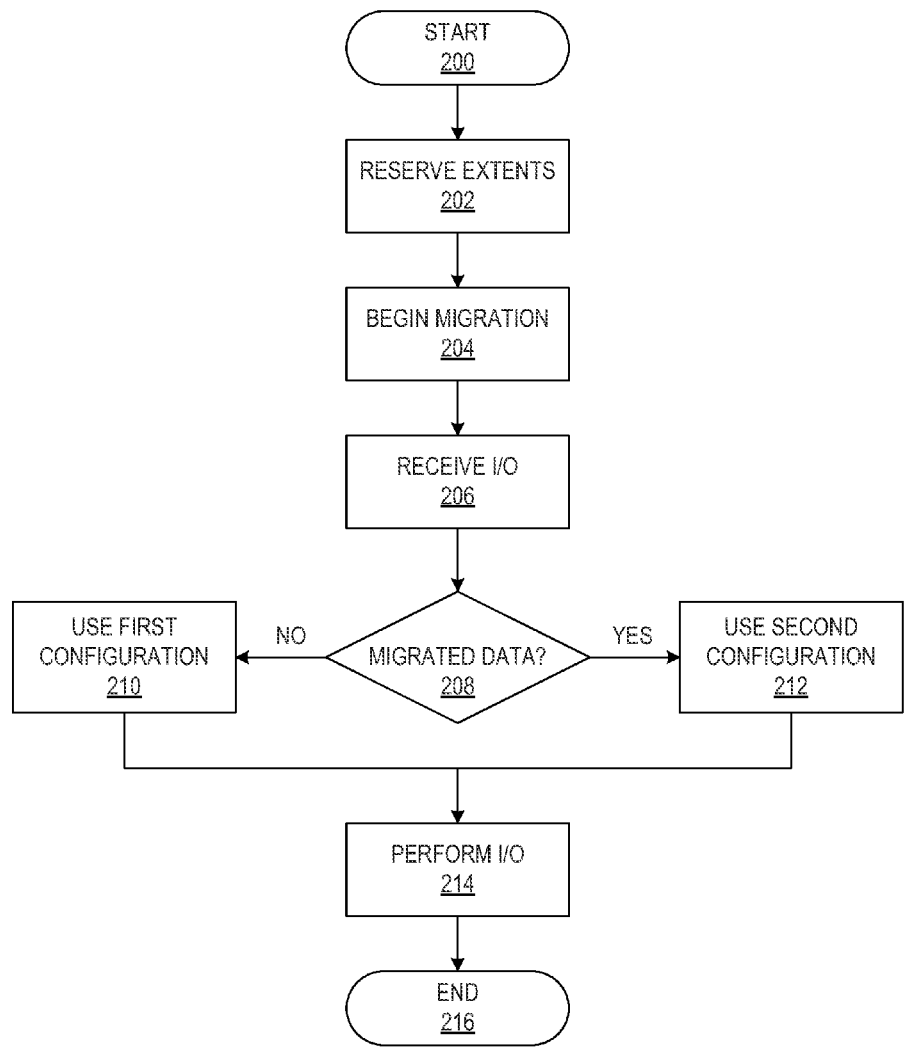
FIG. 2 shows a method of operating a transformation system according to one illustrative embodiment of the present invention.

Turning now to FIG. 2, there is shown a method of operating a transformation system according to one illustrative embodiment of the present invention. After the START step 200, the transformation system 100 reserves extents at step 202 and begins the migration process at step 204. During the migration process, the transformation system 100 continues to receive I/O requests, as shown at step 206. At step 208, the transformation system 100 determines whether the I/O request refers to migrated or unmigrated data. If at test step 208, it is determined that the request refers to unmigrated data (NO at step 208), the transformation system 100 uses the first configuration at step 210 to perform the I/O operation at step 214. If, at test step 208, it is determined that the request refers to migrated data (YES at step 208), the transformation system 100 uses the second configuration at step 212 to perform the I/O operation at step 214. The process completes at the END step 216.

Thus, in brief, the preferred embodiment of the present invention uses reserved extents from the RAID array to create a destination for the first data that is moved as part of the transformation. Once the first data is moved, the freed area is used as the destination for the subsequent data to be moved, and so on, in the manner of a "sliding window".

Figure 3:
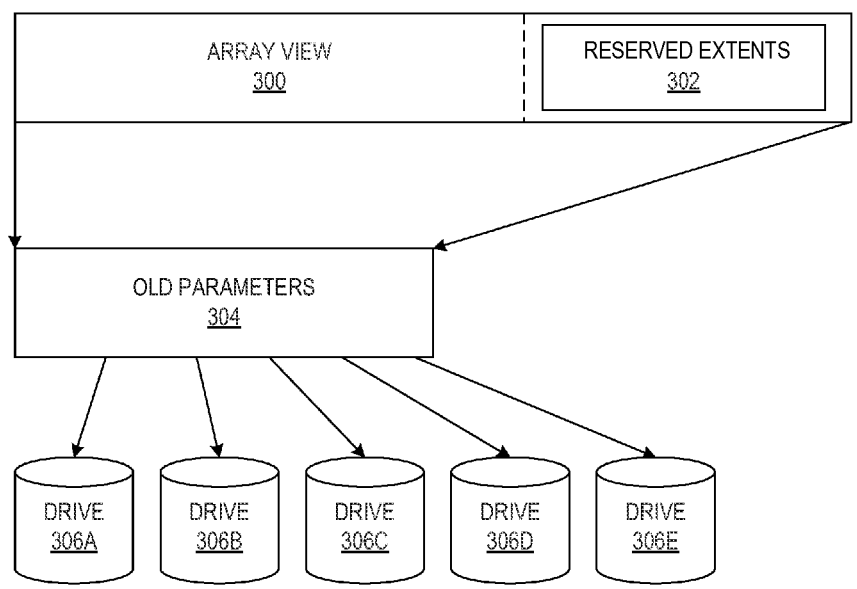
FIGS. 3 to 6 show examples of a system and method of operation according to one illustrative embodiment of the present invention.

Turning now to FIGS. 3 to 6, there will be described examples of the operation of a system and method according to one illustrative embodiment of the present invention. Virtualized storage systems store data in extents on RAID arrays. To allow array transformation to occur, the virtualization software reserves a number of extents at the end of the underlying RAID array and arranges so that data for the virtual volume are never stored there, as shown in FIG. 3. FIG. 3 thus shows array view 300, in which are reserved extents 302. The underlying RAID array comprises drives 306A, 306B, 306C, 306D and 306E and is accessed using old configuration parameters 304.

Care must be taken to reserve sufficient extents to allow the transformation to work without overwriting the old data when writing the new data. When an array transformation is initiated, the storage system sets up two views of the drives that make up the RAID array: one using the old parameters, and one using the new parameters. Initially, all operations are performed using the old view of the drives and so I/O proceeds normally.

Figure 4:
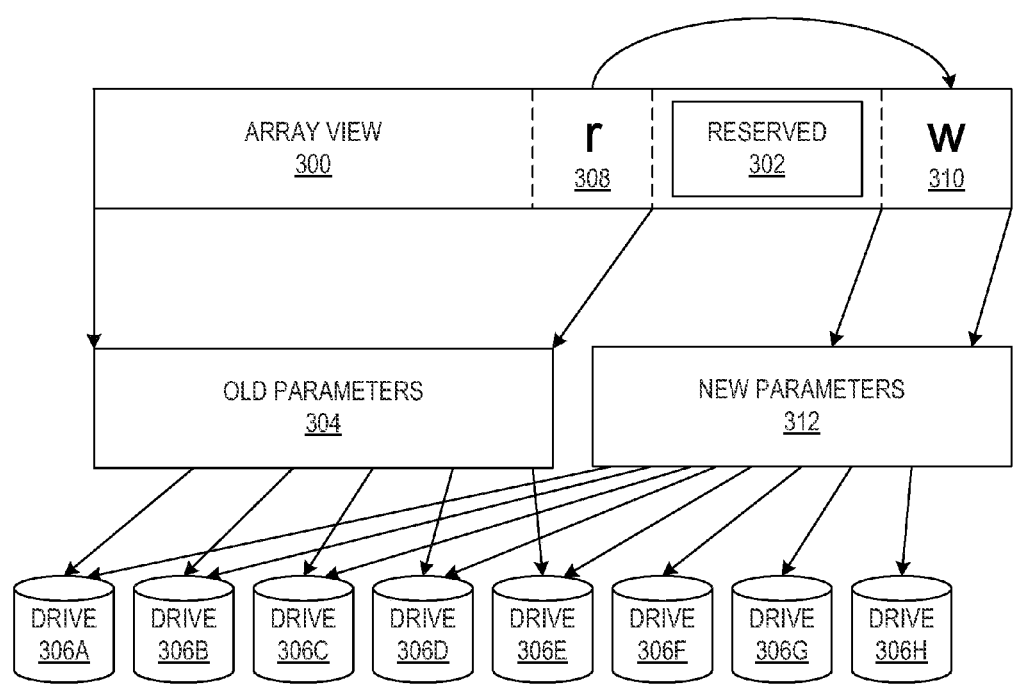
Figure 5:
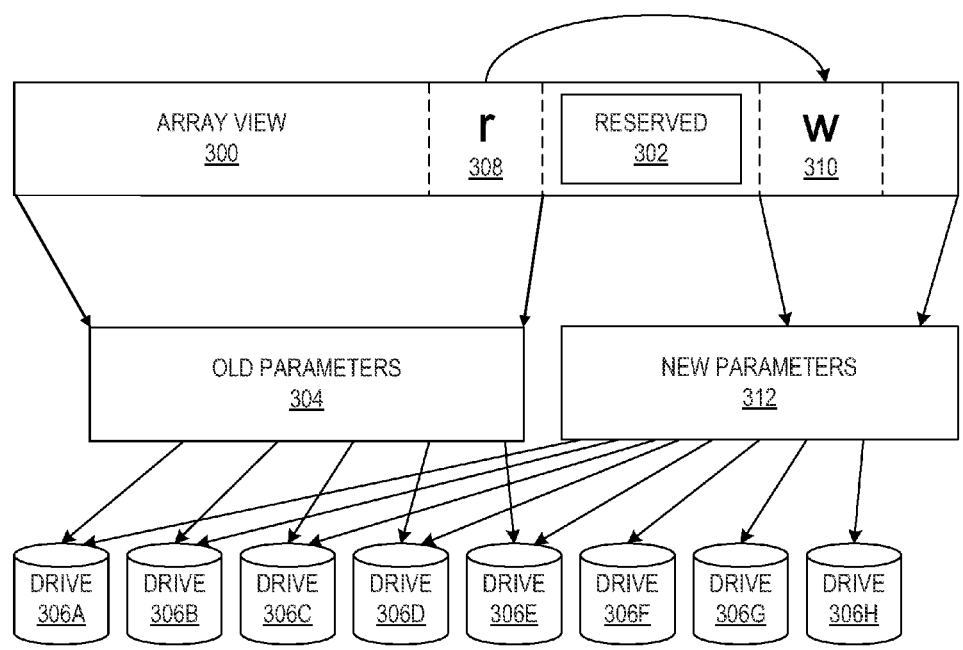

In FIGS. 4 and 5, a RAID array is represented by convention as having a left and a right end, with data ordered from a start point to the left end, and an end point to the right. As shown in FIGS. 4 and 5, the virtualization software begins to move data from the extents at the end of the used part of the array, marked 'r' 308, into the end of the reserved extents, marked 'w' 310. The data is read using the old parameters and is written using the new parameters. Multiple extents are moved in parallel, and once one group of extents has been moved, the virtualization software begins moving the next group of extents into the space that has been freed up by moving the first group of extents, that is, the extents marked as 'r' in FIG. 4. This continues along the length of the RAID array. During this process, I/O operations to extents that have not been moved are performed using the old parameters, and I/O operations to extents that have been moved are performed using the new parameters. Thus FIGS. 4 and 5 show, in addition to features already shown in FIG. 3, the data 308, the 'w' data 310, new parameters 312, and additional drives 306F, 306G, and 306H.

Figure 6:
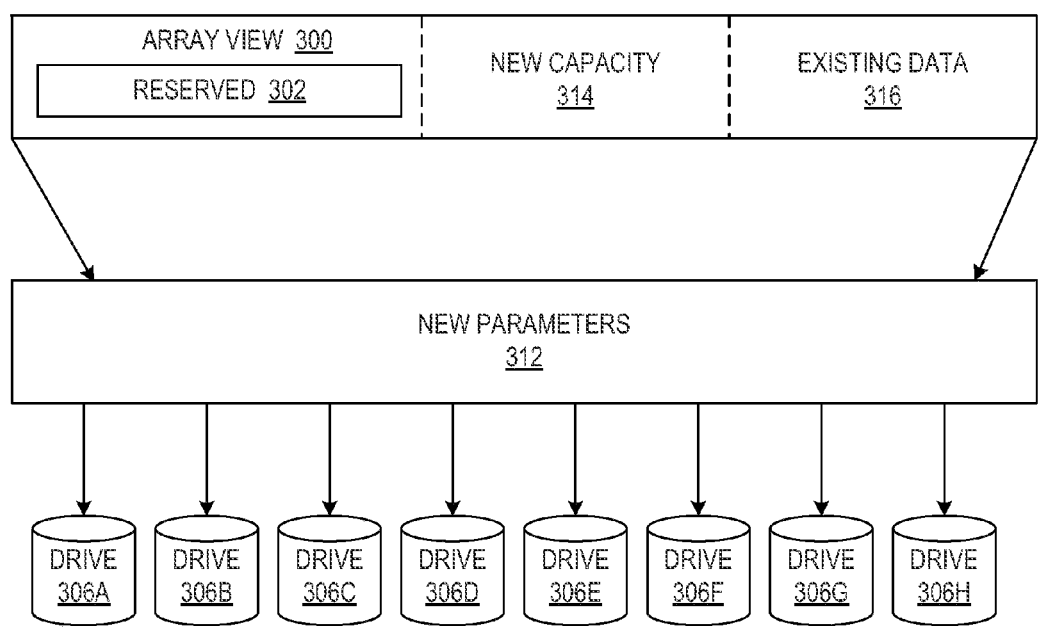

Once the transformation has processed the entire RAID array, the old view of the drives can be discarded, and the RAID array now exists with the new parameters 312 only, as shown in FIG. 6. As can clearly be seen in the progression of FIGS. 3 to 6, the existing data 316 of array view 300 has been transferred in 'r' chunks into 'w' and the reserved extents 302 have progressively moved 'leftward' to the start of the array. The new capacity, if any, is now available for the virtualization software to allocate to the volume. The only difference after transformation is that the reserved extents are now located at the start of the RAID array instead of at the end. If a further transformation of the RAID array is desired, the process can be repeated, but in the other direction, that is, according to the convention, from left to right.

Figure 7:
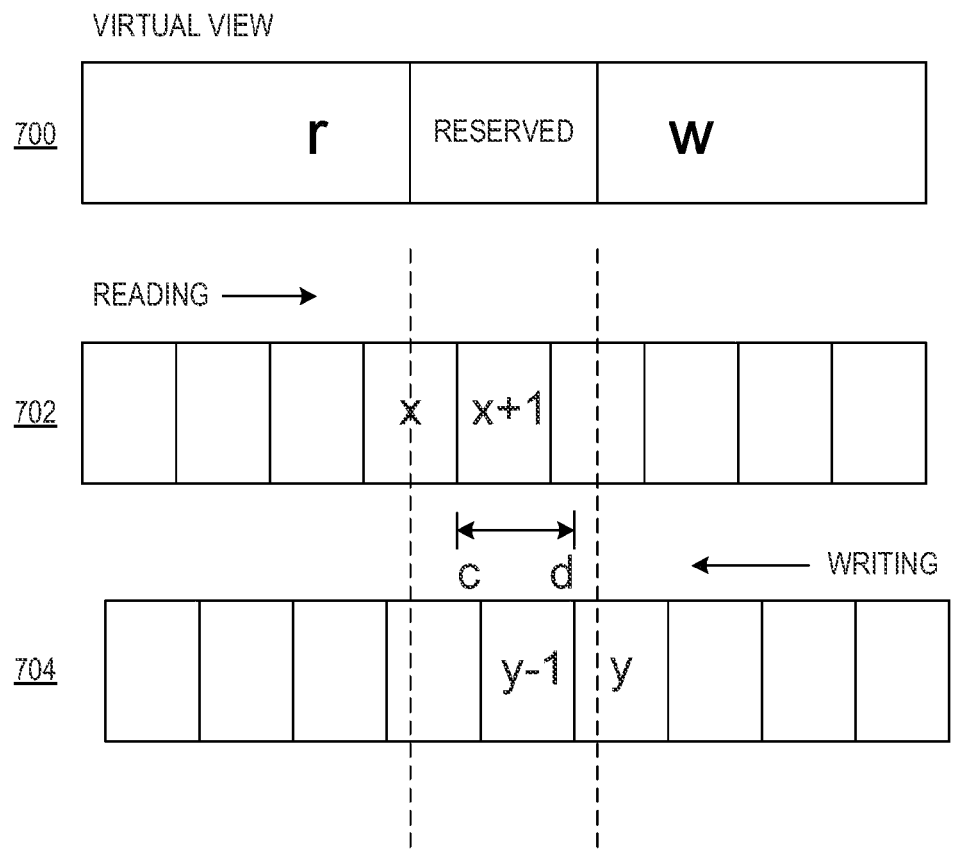
FIG. 7 shows a detail of the operation of a system according to one illustrative embodiment of the present invention.

FIG. 7 shows an enlarged view of the extents being moved, and the RAID stripes of the two underlying views. Virtual view 700 has 'r', reserved, and 'w' sections as previously shown in FIGS. 4 and 5. A first configuration view of the underlying extents is shown at 702 and a second configuration view of the underlying extents is shown at 704. The extent marked 'r' is being read, and is stored on the RAID stripes up to and including stripe x. The extent marked 'w' is being written and is stored on the RAID stripes y and above.

Extents and RAID stripes are usually not the same size and often one size is not a multiple of the other. This means it is possible for a RAID stripe to contain some data from one extent and some more data from the adjacent extent. Due to the striping nature of most RAID algorithms, the fact that data from extent 'r' is stored on stripe x means that the transformation must take care not to write to anywhere that could be part of stripe x. Similarly, it must be ensured that when data is written to extent 'w', the whole of stripe y is available to be written to.

To avoid overwriting the old view, the transformation must ensure that the start of stripe x+1, marked 'c' on the diagram, is at a lower logical block address (LBA) for all drives than the end of stripe y−1, marked 'd' on the diagram. The simplest way to ensure this is to enforce the requirement that the reserved area during transformation must always be large enough to encompass three of the largest stripes—one for stripe x, one for stripe y, and one for the overlapping of stripes x+1 and y−1. Though slightly more than required, calculating the exact overlap is difficult and depends on the RAID algorithms and available extent sizes. For this reason it will be clear to one of skill in the art that it is advisable to pick an upper bound that allows some tolerance.

This means the size of the area that must be reserved on all arrays for which transformation is desired should be equal to the number of extents the transformation wishes to move in parallel, plus enough extents to cover three of the maximally sized RAID stripes.

For the general case, the transformation must always increase or maintain the capacity of the RAID array, and the drives must always be of the same size. It is possible to decrease the size of the RAID array, however the array must be prepared so that the reserved area is extended to include the capacity that is being lost. It is possible to increase or decrease the size of the members in the RAID array. For example, it is possible to transform a nine member RAID-5 array made up of 1 TB disks, where five of its members have been replaced by 2 TB disks due to disk failures, into a five member RAID-5 array made up of just the 2 TB disks. If the size of the members is increasing, then the reserved area must be at the end of the array before transformation commences. If the size of the members is decreasing, then the reserved area must be at the start of the array before transformation commences. If the reserved area is at the wrong end, then the virtualization software must move the reserved area to the correct end, for example by swapping it with the used extents there.

As will be clear to one of skill in the art, embodiments of the invention are particularly advantageous in allowing the system to accept extensions and modifications to the resources made available in a RAID storage system without the disadvantages of the known art.

It will be readily appreciated by one of ordinary skill in the art that various further modifications to the embodiment described above will be apparent to a person of ordinary skill in the art. It will be clear to one skilled in the art that the method of the present invention may suitably be embodied in a logic apparatus comprising logic means to perform the steps of the method, and that such logic means may comprise hardware components or firmware components.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, compact disc read-only memory (CD-ROM), read-only memory (ROM), or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

The invention claimed is:

1. A system for transforming an in-use RAID array from a first array configuration having at least a first parameter to a second array configuration having at least a second parameter while preserving a logical data structure of the in-use RAID array, the system comprising:
    a processor, and
    logic, the logic being configured to:
        reserve, by an extent reservation component, one or more reserved extents;
        read, by a data migration component, unmigrated data from an area of the in-use RAID array arranged according to the first array configuration and write the data to an area of the in-use RAID array arranged according to the second array configuration using the one or more reserved extents to store first migrated data;
        perform, by a first I/O component, I/O operations according to the first array configuration on the unmigrated data prior to its reading by the data migration component; and
        perform, by a second I/O component, I/O operations according to the second array configuration on the first migrated data after the data is written by the data migration component;
        wherein the data migration component is configured to read the unmigrated data from an end of the area of the in-use RAID array arranged according to the first array configuration in a direction towards a start of the in-use RAID array, such that data migration begins by moving data in extents at the end of the area of the in-use RAID array arranged according to the first array configuration to the area of the in-use RAID array arranged according to the second array configuration.

2. The system according to claim 1, wherein the second array configuration comprises a greater or lesser number of disks than the first array configuration, and wherein a size of the one or more reserved extents is equal to or greater than a number of extents of the data that are migrated in parallel plus a number of extents to cover three maximally sized RAID stripes of the in-use RAID array.

3. The system according to claim 1, wherein the in-use RAID array is configured such that the unmigrated data is ordered in extents from the start of the in-use RAID array to the end of the area of the in-use RAID array arranged according to the first array configuration.

4. The system according to claim 1, wherein the RAID array comprises a first number of disks of a first capacity and a second number of disks of a second capacity, and wherein the first array configuration uses the first and the second number of disks and the second array configuration uses only the first or the second number of disks and not both.

5. The system according to claim 4, wherein the first capacity is greater than the second capacity.

6. The system according to claim 4, wherein the second capacity is greater than the first capacity.

7. The system according to claim 1, wherein the second array configuration is of a higher or lower RAID level than the first array configuration.

8. A computer-implemented method of transforming an in-use RAID array from a first array configuration having at least a first parameter to a second array configuration having at least a second parameter while preserving a logical data structure of the in-use RAID array, comprising:
    reserving, by an extent reservation component, one or more reserved extents;
    reading, by a data migration component, unmigrated data from an area of the in-use RAID array arranged according to the first array configuration and writing by the data migration component, the data to an area of the in-use RAID array arranged according to the second array configuration using the one or more reserved extents to store first migrated data;
    performing, by a first I/O component, I/O operations according to the first array configuration on the unmigrated data prior to its reading by the data migration component; and
    performing, by a second I/O component, I/O operations according to the second array configuration on the first migrated data after the data is written by the data migration component;
    wherein the data migration component reads the unmigrated data from an end of the area of the in-use RAID array arranged according to the first array configuration in a direction towards a start of the in-use RAID array, such that data migration begins by moving data in extents at the end of the area of the in-use RAID array arranged according to the first array configuration to the area of the in-use RAID array arranged according to the second array configuration.

9. The computer-implemented method according to claim 8, wherein the second array configuration comprises a greater or lesser number of disks than the first array configuration.

10. The computer-implemented method according to claim 8, wherein the second array configuration comprises a greater or lesser storage capacity than the first array configuration.

11. The computer-implemented method according to claim 8, wherein the RAID array comprises a first number of disks of a first capacity and a second number of disks of a second capacity, and wherein the first array configuration uses the first and the second number of disks, and the second array configuration uses only the first or the second number of disks and not both.

12. The computer-implemented method according to claim 11, wherein the first capacity is greater than the second capacity.

13. The computer-implemented method according to claim 11, wherein the second capacity is greater than the first capacity.

14. The computer-implemented method according to claim 8, wherein the second array configuration is of a higher or lower RAID level than the first array configuration.

15. A computer program product for transforming an in-use RAID array from a first array configuration having at least a first parameter to a second array configuration having at least a second parameter while preserving a logical data structure of the in-use RAID array, the computer program product comprising a non-transitory computer readable storage medium having program instructions embodied therewith, the program instructions executable by a processor to cause the processor to:

reserve, by an extent reservation component, one or more reserved extents;

read, by a data migration component, unmigrated data from an area of an in-use RAID array arranged according to a first array configuration and writing by the data migration component, the data to an area of the in-use RAID array arranged according to a second array configuration using the one or more reserved extents to store first migrated data;

perform, by a first I/O component, I/O operations according to the first array configuration on the unmigrated data prior to its reading by the data migration component; and perform, by a second I/O component, I/O operations according to the second array configuration on the first migrated data after the data is written by the data migration component;

wherein the data migration component reads the unmigrated data from an end of the area of the in-use RAID array arranged according to the first array configuration in a direction towards a start of the in-use RAID array, such that data migration begins by moving data in extents at the end of the area of the in-use RAID array arranged according to the first array configuration to the area of the in-use RAID array arranged according to the second array configuration.

16. The computer program product according to claim 15, wherein the second array configuration comprises at least one of a greater or lesser number of disks than the first array configuration, or a greater or lesser storage capacity than the first array configuration.

17. The computer program product according to claim 15, wherein the RAID array comprises a first number of disks of a first capacity and a second number of disks of a second capacity, and wherein the first array configuration uses the first and the second number of disks, and the second array configuration uses only the first or the second number of disks and not both.

18. The computer program product according to claim 17, wherein the first capacity is greater than the second capacity.

19. The computer program product according to claim 15, wherein a size of the one or more reserved extents is equal to or greater than a number of extents of the data that are migrated in parallel plus a number of extents to cover three maximally sized RAID stripes of the in-use RAID array.

20. The computer program product according to claim 15, wherein the second array configuration is of a higher or lower RAID level than the first array configuration.

* * * * *